Aug. 1, 1944.   M. JONES   2,354,917

POSITION INDICATING MECHANISM

Filed Feb. 9, 1942   2 Sheets-Sheet 1

Inventor
Meredith Jones
By Reynolds & Beach
Attorney

Aug. 1, 1944.  M. JONES  2,354,917
POSITION INDICATING MECHANISM
Filed Feb. 9, 1942    2 Sheets-Sheet 2
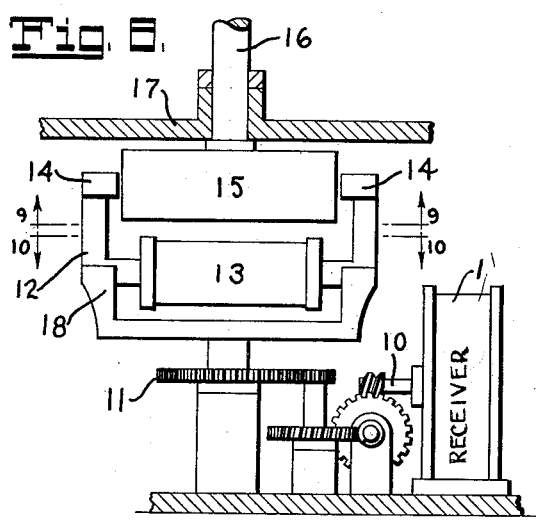
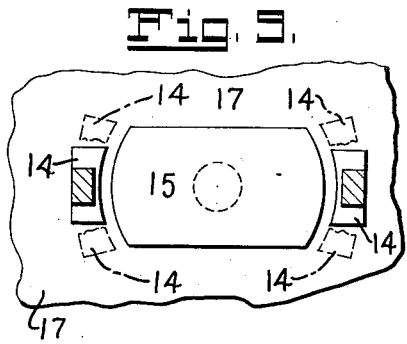
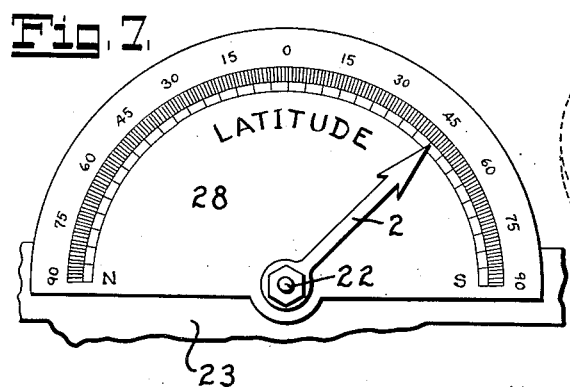
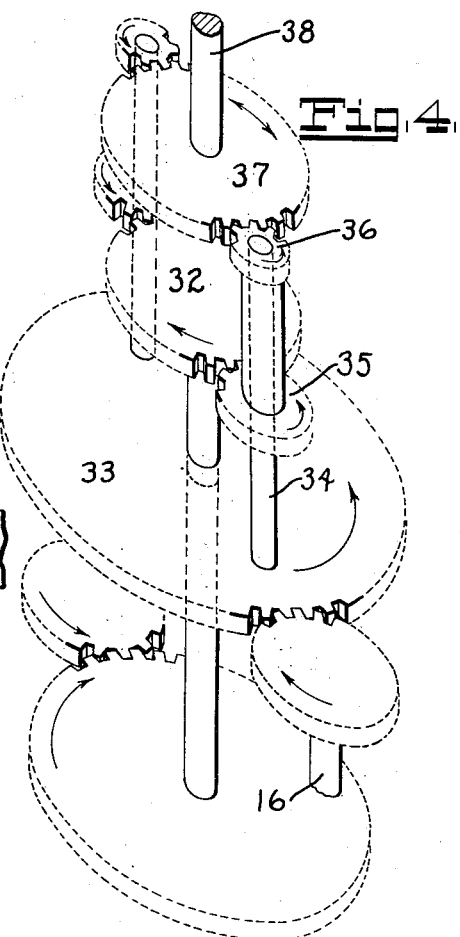
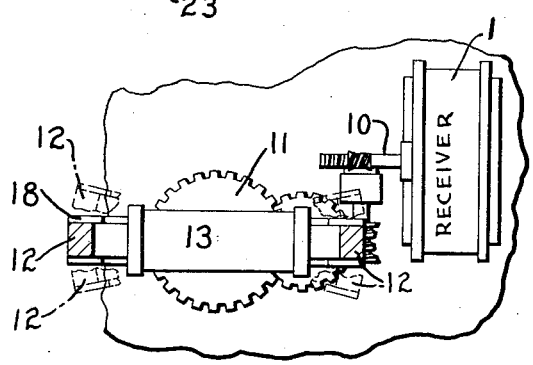
Inventor
Meredith Jones
By Reynolds + Beach
Attorneys Patented Aug. 1, 1944

2,354,917

UNITED STATES PATENT OFFICE 2,354,917

POSITION-INDICATING MECHANISM

Meredith Jones, Seattle, Wash.

Application February 9, 1942, Serial No. 430,166

12 Claims. (Cl. 33—204)

My invention relates to position and course indicating and plotting devices. In my co-pending application, Serial No. 430,165, filed February 9, 1942, for a Gyroscopic navigational device, I have disclosed a navigational instrument which either maintains at all times a constant relationship to the earth's rotative axis, or whose relationship to the earth will change constantly in a predetermined and prescribed manner. The mechanism described herein may be incorporated in a navigational system with and be driven by such gyroscopic device.

As an example of the operation of my navigational gyroscope, it may be positioned with its axis parallel to the rotative axis of the earth. The stability of its rotation in space preserves the direction of its axis of rotation irrespective of its movement north or south across the surface of the earth, so that the angle between the spin axis of the gyroscope and a local plane tangential to the earth's surface, or horizontal, will vary, but such angle will not be altered by an east or west movement. Thus the dip of the gyroscope's spin axis will bear a definite relationship at all times to the latitude of the position upon the earth's surface at which the gyroscope is located, and the change in this angle as the gyroscope moves corresponds precisely to the change in latitude effected.

Alternatively, a gyroscope may be disposed with its spin axis in a plane perpendicular to the earth's axis of rotation. When the gyroscope is set in motion in this position the spin axis immediately begins to swing in such plane whether or not the device is moved across the surface of the earth, for such axis maintains an unvarying spatial direction whereas the position of the device in space progressively changes along a circular path as the earth rotates upon its axis. With respect to the local tangent to such circular locus, which is a horizontal line, the angular velocity at which the spin axis of the gyroscope is relatively displaced is constant and predictable as long as the location of the gyroscope upon the earth's surface is not changed. Any variation in angular velocity between the gyroscope spin axis and a horizontal east-west line, therefore, whether increase or decrease, denotes a change in the longitude component of the gyroscope's location.

It will be evident that the progressive change in latitude and longitude of the gyroscope's position will be very gradual, and in order to insure steady progression, rather than spasmodic jumps as the gyroscope is moved, I have provided a constant oscillating or hunting movement of each gyroscope, but such motion would interfere with direct observation of the attitude of the gyroscope unit relative to an index or with the operation of recording or indicating devices.

My present mechanism, therefore, has been devised to make a reading of longitude or of latitude available immediately without calculation, or, if desired, to plot a course integrating the changes both in latitude and in longitude without human intervention. Moreover, it may just as conveniently be located in a position remote from the gyroscopic devices as proximate to them. Especially is this capability desirable when such mechanism is used in an airplane, for example, where the space for instruments within range of the pilot's visibility is at a premium.

The indicating or plotting instruments are particularly adapted for use with separate gyroscopic devices, one responsive to changes in latitude, and the other to changes in longitude. Movement of the gyroscopic units is transmitted by repeater systems, such as a stepping motor, or a self-synchronous motor combination, to the indicator drive mechanism.

If there is no change in latitude, the displacement of the oscillating latitude gyroscopic unit each side of a central position will be the same. In whatever manner the latitude may be indicated, it would be undesirable for the indicator to vibrate back and forth in synchronism with the oscillation of the latitude gyroscopic device. Between such indicator and the repeater mechanism, therefore, is interposed an oscillation damper composed of a magnet rocking through a small angle in synchronism with the gyroscopic mechanism, which is disposed adjacent to an armature of large mass and having a large moment of inertia which prevents it from following the oscillations of the magnet. As long as the acceleration of the magnet in opposite directions is equal the massive armature will remain stationary, but if it is greater in one direction than in the other, which would be caused by movement of the latitude gyroscopic device to a different latitude, the zero acceleration phase shifts correspondingly and the oscillation damper armature will be swung progressively in accordance with that absolute latitude change. Such movement in turn will be reflected in a displacement of the latitude indicating pointer, or equivalent recording arm, or both.

In driving a longitude indicator by movement of the longitude gyroscopic device not only must its vibration be damped but also the drive mechanism must compensate for the angular velocity caused purely by rotation of the earth about its axis. This is effected by integrating with the progression of the longitude gyroscopic unit repeater opposed movement of time-keeping mechanism. The resultant absolute movement of the longtiude indicator or recorder will therefore register only a change in the longitude component of the gyroscope. Such integration may be effected through the medium of differential mechanism, such as an epicyclic gear train, in which rotation of the time-keeping mechanism and of the longitude oscillation damper drive balance each other, except to the extent of an acceleration or deceleration in rotation of the damper drive from a constant angular displacement in response to a change in the longitude component of the gyroscope's position.

The indicating mechanism for latitude and longitude may merely be fixed latitude and longitude dials having movable pointers.

Course plotting mechanism may be employed in place of, or in addition to merely indicating mechanism, incorporating a globe rotatable about its polar axis according to a change in longitude of the gyroscopic device. The latitude mechanism may swing an arm to move its free end north or south to indicate at all times the position upon the globe of the latitude and longitude gyroscopic devices, so that the latitude and longitude of such position may be read directly from the globe as well as the position with reference to the geography of the earth being indicated. A stylus on the free end of the latitude arm will trace upon the surface of the globe the course traversed by the vessel or vehicle in which the latitude and longitude gyroscopic devices are mounted.

The general purpose of the mechanism herein disclosed is, therefore, to translate the movement of a navigational gyroscopic device into an indication or reading of position upon the surface of the earth. Additionally or alternatively latitude and longitude indications may be integrated to plot automatically a position upon a globe or to trace a course upon its surface. Latitude and longitude indications are afforded by a nonvibratory member despite the oscillatory or hunting motions of the gyroscopic devices by which they are driven.

The mechanism illustrated in the drawings is a practical embodiment of the various elements comprising my mechanism, but it will be understood that changes may be made in its various parts without altering the principle of operation of the device as a whole, and such modifications are embraced within the claims.

Figure 1 is a side elevation view of the globe position indicating or recording mechanism, while

Figure 4 is a diagrammatic top perspective view of the gear train employed in the mechanism shown in Figures 2 and 3.

Figure 6 is a plan view of a longitude dial type indicator which may be mounted upon the longitude drive mechanism of Figures 2 and 3 in place of the globe. Figure 7 is a side elevation view of a dial type latitude indicator which may be actuated by the latitude drive mechanism of Figure 5.

Figure 5:
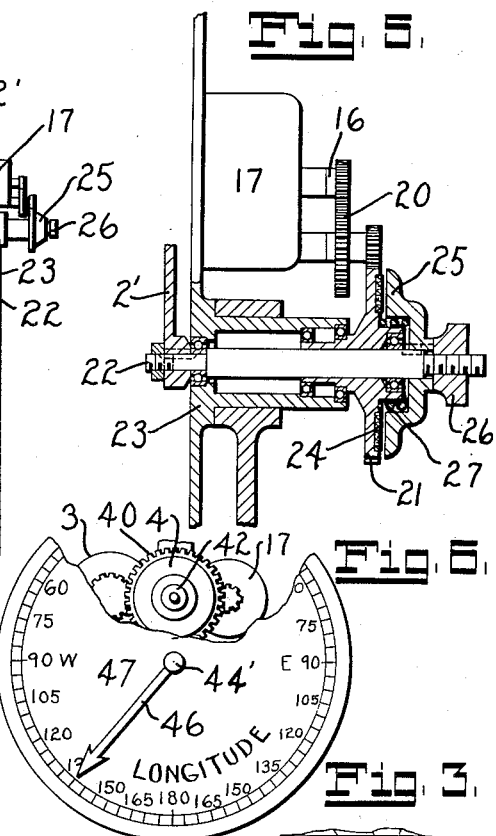
Figure 5 is a side elevation view, with parts in section, of the latitude drive mechanism portion of the device shown in Figure 1.
Figure 3:
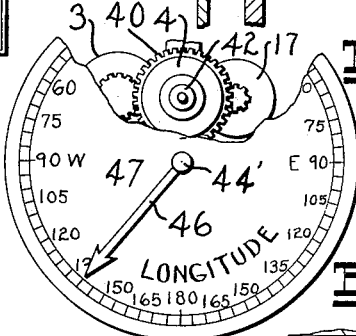
Figure 3 is a further elevation view of the mechanism shown in Figure 2, taken perpendicular to Figure 2.
Figure 2:
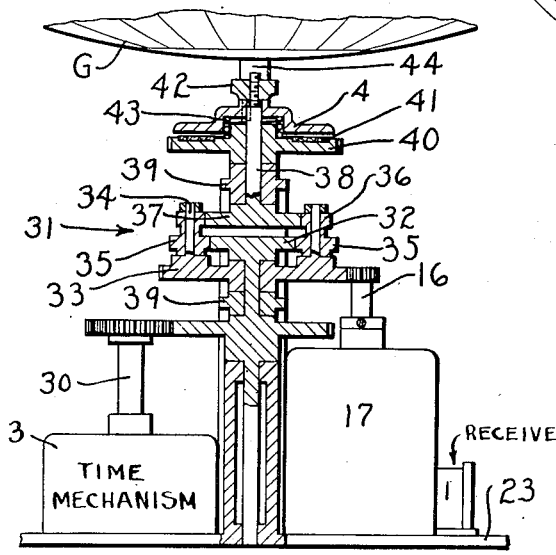
Figure 2 is an enlarged side elevation view, showing parts in section, of the globe mounting and longitude drive mechanism.

Figure 8 is a vertical section through the oscillation damping mechanism of Figures 2 and 5, showing parts in elevation. Figure 9 is a transverse section through the oscillation damper taken on line 9—9 of Figure 8. Figure 10 is another transverse section through the oscillation damper along line 10—10 of Figure 8.

My indicating and recording instruments are intended primarily for use with separate gyroscopic units, one responsive to a change in the latitude component and another responsive to a change in the longitude component of their position, such, for example, as shown in my above mentioned copending application. The essential requirement for my present system, however, is that the driving mechanism include two systems, one actuated by a variation in the latitude component, and the other by a variation in the longitude component of the vessel or vehicle.

Assuming that the latitude and longitude drives are of the oscillatory type, the movement in each case will be transmitted by a repeater system to the receiver 1 of an oscillation damper. Such repeater system may employ a stepping motor or a self-synchronous motor set, both of which are well known to the art. In either case in order to transmit small movements accurately, movement of the gyroscope mechanism must be stepped up decidedly by the transmitter, and such movement correspondingly reduced by the receiver. The spindle 10 of the repeater receiver will rotate first in one direction and then in the other, the period and extent of such rotation depending jointly upon the nature of the gyroscope unit's oscillatory movement and the type of transmitting mechanism employed. The ratio of the gear reduction mechanism 11, interposed between the spindle 10 and the oscillating magnet 12, will in turn depend upon the rate of rotation of the spindle.

The magnet 12 is preferably of the electromagnetic type, in which a continuously energized electric coil 13 encircles a core of laminated soft iron plates, following conventional practice, although such magnet may be of the permanent type. The core is of generally horse shoe shape and its poles are formed as wide shoes 14, each disposed closely adjacent an end of an armature 15 to attract, but not to touch it. Such armature is relatively heavy as compared to the weight of the magnet. A shaft 16, mounted in a wall 17 of the oscillation damper housing, supports the armature for rotation about an axis coincident with that about which magnet 12 swings. The follower too may be a magnet instead of soft iron, either of the permanent or electro-magnetic type. If it is a magnet, the driving member may even be merely soft iron, but in any case the follower should be massive, having a high rotative inertia, and it should be disposed so that its ends are attracted by member 12.

As the repeater receiver spindle 10 turns first in one direction and then in the other, the cradle 18, driven by the reduction gear mechanism, will oscillate back and forth perhaps several times a second through a few degrees, in synchronism with the oscillations of the gyroscopic device, and substantially with simple harmonic motion. The magnet 12, resting in this cradle, coincidentally will be swung back and forth between the broken line positions shown in Figures 9 and 10. The armature 15 has an inertia too great to permit it to follow such rapid oscillating movement of the magnet 12. The torque exerted by the magnet reverses to produce an opposite torque before the armature can be moved by the first torque. As a result, if the rotation of spindle 10 is equal and opposite in direction, causing equal swinging of magnet 12 each side of its central position, armature 15 will remain stationary, corresponding, for example, to a constant latitude position.

If the latitude is changing, however, the rotation of spindle 10 in opposite directions will not be equal, but on the contrary displacement of its ends to one side of the center line of armature 15 will be slightly greater than the displacement to the other side, although such difference may not be perceptible in any given oscillation cycle. The eccentricity of such movement would increase progressively, however, if the armature remained stationary, so that the cumulative effect will be for the center of swing of the ends of magnet 12, which may be termed the zero acceleration phase, being that position of dynamic equilibrium where the velocity is greatest, to shift gradually in one direction or the other, depending upon the sense in which the latitude component is changing, that is, whether in a northerly or southerly direction. As such center of oscillation shifts, the armature 15, although unable to follow individual oscillations, will nevertheless creep gradually in one direction or the other so that its median line will at all times coincide substantially with the mean position of magnet 12. By this mechanism, therefore, shaft 16 will be rotated gradually in a clockwise or counter-clockwise direction, depending upon the direction of shift east or west in latitude, in turn causing a relevant displacement of the latitude indicator.

In the case of longitude oscillation damper, shaft 16 will be turned practically always in the same direction but at different rates, depending upon whether the longitude gyroscopic device is stationary or is moving east or west. A constant speed of such rotation indicates that the longitude of the gyroscope's position is not changing, but any variation, whether slower or faster, in such speed denotes a change in longitude component at a rate corresponding to the degree of change in speed of such shaft. A retardation in speed accompanies a westward shift in longitude component, whereas an acceleration is produced by an eastward shift in longitude.

Figure 1:
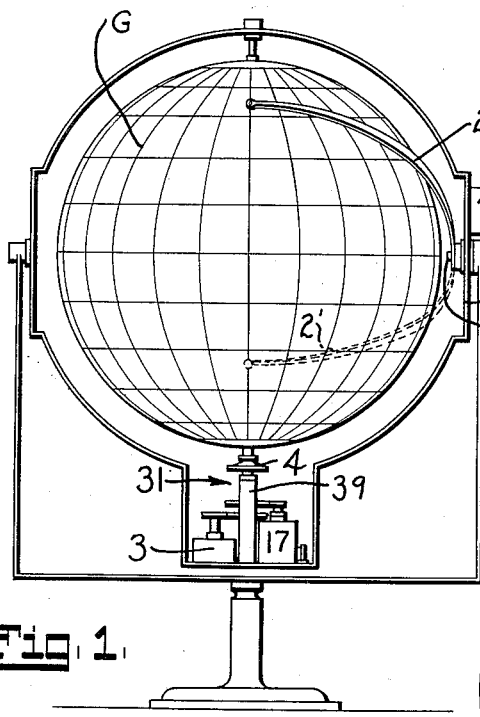

The latitude indicating arm, whether it be of the pointer type 2, shown in Figure 7, or of the globe type 2' shown in Figure 1, preferably rotates through only 180 degrees, and yet its accuracy must be maintained within a small fraction of a degree. Consequently it is necessary that the armature 15 of the latitude drive mechanism move through a considerably larger angle than the latitude indicator, so that no appreciable error will result from a slight misalignment of its center line with the center of swing of magnet 12. A reduction gear train 20 is therefore interposed between the spindle 16 and the main drive gear 21 for the latitude arm.

The latitude arm 2 or 2' is secured upon a spindle 22 rotatively journaled in a suitable supporting frame 23. Preferably shaft 22 extends through drive gear 21, which gear is also supported for rotation of such shaft relative to it by suitable bearings in frame 23. In first connecting the arm to the latitude repeater system it is necessary to synchronize the parts so that the position indicated by the arm will correspond to the setting of the gyroscopic device. For this purpose a clutch is interposed between the drive gear 21 and shaft 22, which may consist of a friction face 24 on one side of gear 21, against which the face of a clutch disc 25 may be pressed by a knob or nut 26 threaded upon the end of shaft 22, as shown in Figure 5. The clutch plate 25 is slidable upon and keyed to shaft 22, and will be moved out of contact with friction ring 24 by a spring 27 interengaged between the clutch plate and gear 21 when the nut 26 is released. With the clutch thus disengaged plate 25 may be rotated relative to gear 21 until the indicating arm is synchronized with the position of the gyroscopic unit. As the knob or nut 26 is now screwed down, spring 27 will be compressed and clutch plate 25 will be pressed tightly against friction ring 24 to rotate conjointly therewith. A positive drive will thus be effected from shaft 16 of the oscillation damper to shaft 22 for rotating the latitude arm 2 or 2', as the case may be, so it is essential that a proper relationship of the arm to the gyroscope repeater system has been established before the clutch is engaged.

Where a latitude dial 28 alone is used, as shown in Figure 7, the pointer 2 carried by shaft 22 will swing about the arcuate degree scale, which, as shown, is graduated in degrees each way from a zero point through an arc of 90 degrees. Location of the pointer on the left side of the center will indicate that the gyroscopic device is in the Northern Hemisphere, whereas if the pointer is at the right of center the gyroscopic device is shown to be in the Southern Hemisphere. Similarly, movement of the pointer 2 toward the right will indicate southward progress of the gyroscopic device, whereas deflection toward the left occurs in response to movement of the gyroscopic device northward.

The scale shown is graduated in degrees, and a movement of the pointer through one degree reflects a corresponding movement of the gyroscopic device, effected by its displacement over the surface of the earth, to change the latitude of its position one degree. It will be evident that if the device is to be used only in the Northern Hemisphere, or only in the Southern Hemisphere, a scale both sides of zero, corresponding to the Equator, may not be required. Also the accuracy of indication may be increased if each degree space is doubled in size and pointer 2 is geared for twice as great movement by spindle 16, so that the scale each side of zero may extend over a semicircle instead of a quarter-circle and the pointer will actually rotate through two degrees for each graduation representing one degree. A more satisfactory method is to employ an additional scale or dial graduated in minutes, or one for minutes and one for seconds, supplementing the indication of the pointer 2. The cooperating pointers will be driven from spindle 16 at correspondingly higher speeds, as in conventional time-keeping practice.

When the globe indicating or plotting device shown in Figures 1 and 5 is used, the end of the arm 2' must lie and move in a plane perpendicular to the shaft 22 and including the axis of the globe about which it rotates. In order to conserve space as much as possible, therefore, it is preferred that this arm be of quadrant shape so that it will conform to the curvature of the globe G and lie close to it in all swung positions of the arm. The globe G, arm 2', and immediate drive mechanism for such arm, are all mounted on the frame 23 encircling the globe. This frame may be journaled for swinging about a horizontal axis upon a yoke supported by a suitable stand.

To accomplish rotation of the globe in accordance with changes in longitude only, rotation of the longitude oscillation damper spindle 16 must be compensated for diurnal rotation of the earth about its own axis. Since such rotation is a time relationship, the movement of the longitude oscillation damper shaft can be integrated with the rotation of shaft 30 which is driven by time-keeping mechanism 3, in the manner shown in Figure 2. Such time-keeping mechanism is preferably motor driven, so that the additional load of driving a gear train will not interfere with its accuracy. The interconnecting mechanism consists of an epicyclic gear train generally indicated at 31, including suitable gear reduction mechanism. A sun gear 32 may be rotated in one direction by the time-keeping mechanism, as shown in Figure 4. A gear 33 carrying the spindles 34 of planet gears 35 meshing with the sun gear 32 is rotated in the opposite direction by the longitude oscillation damper shaft 16, as also shown in Figure 4. Another set of planet gears 36 are carried by spindles 34, which rotate conjointly with planet gears 35. Planet gears 36 in turn mesh with another sun gear 37 integral with shaft 38, constituting the drive shaft to turn the support for the globe G, which is rotated in response to a change in longitude. A support band and bearing 39 engages shaft 38 to keep it from tilting and also supports the weight of the globe. This entire drive mechanism is supported upon frame 23, and the globe likewise is carried directly by this frame and kept from tilting by a pivot engaged with the opposite side of the frame.

Various other types of integrating gear arrangements may be employed instead of the particular epicyclic train illustrated, while still obtaining the desired coordination of the longitude gyroscopic device and time-keeping mechanism. A sun and ring gear epicyclic train might be used, for example, or a bevel gear differential drive could be employed. In any of these arrangements the direction of rotation of the time-keeping mechanism and longitude oscillation damper must be correlated with gears of the proper size so that the drive spindle 38 will be rotated only when the longitude of the gyroscopic device changes. Thus the gears of the integrating mechanism under such circumstances will be rotated oppositely to such an extent that the drive shaft 38 remains stationary except when the longitude of the gyroscopic device is changed either east or west, when it will rotate correspondingly in one direction or the other through a proportionate angle.

If an epicyclic gear train of the type shown in Figures 2 and 4 is used, gears 32 and 33 should be driven by time-keeping mechanism 3 and oscillation damper shaft 16 through proper reduction gear mechanism, such that the constant rotative speed of gear 32 in one direction will be equal to the speed of gear 33 in the opposite direction, responsive to movement of the longitude gyroscopic device occasioned solely by diurnal rotation of the earth. Under these circumstances the ratio of gears 32 to 35 should be twice the ratio of gear 37 to gear 36. Thus if the ratio of gears 32 to 35 is one to one, the ratio of gears 37 to 36 should be two to one. Using gears of the proportions illustrated, the ratio of gears 32 to 35 is two to one, while the ratio of gears 37 to 36 is four to one. Thus the two to one ratio between the upper and lower gear trains is preserved.

Assuming now that the longitude gyroscopic device is stationary upon the earth's surface, for each revolution by such device of gear 33 in a counterclockwise direction, as indicated by the arrow in Figure 4, gear 32 will simultaneously be rotated once in a clockwise direction by the time-keeping mechanism 3. Such rotation of gear 32, by rotation of planet gears 35 and 36, tends to rotate gear 37 through one-half a revolution in a clockwise direction, because of the above-mentioned two to one relationship of the gear ratios. Rotation of gear 33 in a counterclockwise direction. through one revolution, however, tends to rotate gear 37 through one-half a revolution in a counterclockwise direction because of the two to one gear ratio. The net result, therefore, is that gear 37 remains stationary as long as gears 32 and 33 rotate in opposite directions at equal speeds.

The speed of gear 32 will always be constant because it is driven by the constant speed time-keeping mechanism 3. The speed of rotation of gear 33, however, may vary above or below the speed of gear 32, though its direction of rotation will always be counterclockwise, unless the rate of change in longitude component of the gyroscopic device should exceed the rotative speed of the earth, which would be apt to occur only near the poles. Thus when the longitude component is changing in a westerly direction, the rotation of gear 33 will be retarded, and gear 37 would begin to move in a clockwise direction, as seen from above, under the influence of time controlled gear 32. In turn globe G will be rotated counterclockwise, or from west to east, because of the reversing gearing between it and shaft 38, and the pointer or stylus of latitude arm 2' would indicate westward progression on the globe.

On the other hand, if the longitude gyroscopic device were moving eastward, the change in relationship of its spin axis to the earth would be faster, and gear 33 would be driven in a counterclockwise direction at a speed greater than that of gear 32 in a clockwise direction. As a result, gear 37 will then move in a counterclockwise direction to rotate the globe G clockwise, or from east to west, at a speed equal to the rate of longitude change of the longitude gyroscopic device. The stylus or pointer on the end of latitude arm 2' will thus indicate at all times not only the latitude but also the correct longitude, so that its position on the globe will correspond to the actual location on the earth's surface of the gyroscopic devices, and the path which it traces will portray the course travelled by the vehicle.

As in the case of the latitude drive mechanism, the rotative position of the globe G must correspond with the disposition of the longitude gyroscopic device when it is properly oriented for operation. The clutch 4, similar in construction to the clutch employed with the latitude drive mechanism, will enable such relationship to be established in setting up the mechanism, and adjustments can thereafter be made from time to time to insure the accuracy of the device, but otherwise the recording or indicating mechanism need never be disconnected from the oscillation damper. This clutch includes the friction plate 4 keyed to shaft 38, beneath which is a gear 40 having a friction face 41 adapted to co-operate with the friction plate. When the clutch engaging nut 42 is loosened, spring 43 will hold the clutch plate up out of engagement with the friction surface 41, so that the gear 40, being loose on shaft 38, may be rotated with the globe to orient it properly. When the nut 42 is screwed down to compress spring 43 and to engage the clutch plate and friction surface, gear 40 will be driven positively by shaft 38.

Between the epicyclic gear train, above described, and the globe supporting shaft 44 mounted upon bracket 39 of frame 23, may be interposed a gear 45 or a gear train meshing with gear 40. This gear train will have the proper reduction ratio and arrangement to rotate globe shaft 44 in a direction and at a speed synchronized with the longitude gyroscope repeater system so that the rotation of globe G will indicate accurately any change in longitude component of the gyroscope's position. In the particular structure illustrated, gear 45 rotates oppositely to gear 40 and shaft 38, so that in order to obtain the proper direction of globe rotation gear 33 must turn counterclockwise and gear 32 clockwise, as described.

Where a longitude indicating dial is used in place of the globe arrangement, a pointer 46 is carried by shaft 44' to rotate over the face of a disc 47 which is graduated in east and west longitude from zero, corresponding to the Greenwich meridian, to 180 degrees, as shown. The gearing interposed between shafts 38 and 44' must be such as to rotate the latter at a proper proportionate speed, but in the same rotative senses. The operation of this mechanism is otherwise the same as the globe rotating mechanism, except that the reading will be in degrees of east or west longitude instead of the longitude reading being ascertained from the globe. Supplementary gear trains and dials may be provided for minute and second readings as in the latitude degree indicator described.

The degree type of latitude and longitude indicators may be used alternatively with the globe indicator or plotter. Each type of device has its advantages, however, for the numerical latitude and longitude can be read much more accurately and quickly from dials, especially if minute and second dials are provided, than by interpreting the location indicated on the globe by the latitude arm. On the other hand, the globe device of Figure 1 can be used to keep an automatic record of the course travelled. It will be evident that a dial pointer 2 and a globe arm 2' may both be driven simultaneously from shaft 22 by suitable gearing, or by mounting one type of indicator arm on one end of the shaft and the other arm on the other end.

Similarly, the longitude integrating mechanism of Figure 2 can be employed to rotate both globe G and a pointer 46 by two gear trains driven by gear 40. Alternatively the latitude and longitude repeater systems may be provided with additional receivers to actuate separate oscillation dampers and gear systems for the drive indicators and globe plotter.

The pointers 2 and 46 will thus be rotated by the respective latitude and longitude drive mechanisms so that the position may be read at a glance, while the position of the vehicle and the course which it has followed will be shown on the globe through the coordination of latitude and longitude changes. reflected in a north and south swinging of the free end of arm 2' and an east or west rotation of globe G, respectively. Ordinarily, therefore, it will be desirable to have both a globe recording device and latitude and longitude indicating dials.

What I claim as my invention is:

1. In a navigational registering device, a frame, a globe representing the earth and journalled in said frame to rotate about its polar axis, drive means responsive to the longitude component of such device's position and operable to rotate said globe about such axis relative to said frame, an arm fixedly pivoted on said frame to swing about an axis lying in the equatorial plane of said globe and intersecting its polar axis, and carrying an indicator movable in the meridianal plane of said globe perpendicular to the arm's pivot axis by swinging of said arm, and means to swing said arm including drive means responsive to the latitude component of such device's position.

2. In a navigational registering device, a rotatively mounted globe representing the earth, and epicyclic gearing for rotating said globe including one component of said gearing rotated in accordance with the algebraic sum of the longitude component of such device's position and of the spatial displacement of such device caused by diurnal rotation of the earth, time-keeping mechanism, another component of said gearing actuated by said time-keeping mechanism, and a third component of said gearing integrating the movement of said first two gearing components to govern said globe rotating means in response to the longitude component of such device's position alone.

3. In a navigational registering device, a rotatively mounted globe representing the earth, and means for rotating said globe about its polar axis including drive means responsive to the algebraic sum of the longitude component of such device's position and of the spatial displacement of said device caused by diurnal rotation of the earth, time-keeping mechanism, drive means actuated by said time-keeping mechanism, and means integrating the movement of said two drive means to govern said globe rotating means in response to the longitude component of such device's position alone, an arm swingable about an axis in the equatorial plane of said globe and intersecting its polar axis, said arm having an indicator movable along a meridian of said globe by swinging of said arm, and means for swinging said arm including drive means responsive to the latitude component of such device.

4. In a navigational registering device, an oscillating receiver responsive to the latitude component of such device's position, a second oscillating receiver responsive to the algebraic sum of the longitude component of such device's position and of the spatial displacement of such device caused by diurnal rotation of the earth, means associated with each receiver to damp the oscillations thereof, time-keeping mechanism, drive means actuated by said time-keeping mechanism, integrating means for algebraically combining the movement of said drive means and of said second oscillating receiver for counteracting the movement of such receiver corresponding to the spatial displacement of the device caused by diurnal rotation of the earth, a rotatively mounted globe rotatable about its polar axis by said integrating means, and a pivoted arm swingable about an axis in the equatorial plane of said globe and intersecting its polar axis in response to movement of said first receiver, and having an indicator movable along a meridian of said globe by such swinging of said arm.

5. In a navigational registering device, gyroscope actuated drive means responsive to a change in the spatial relationship of such device as a resultant of diurnal rotation of the earth and a shift in position of the device over the surface of the earth, time-keeping mechanism, stationary means supporting said time-keeping mechanism and said gyroscope actuated drive means, means for registering the longitude component of such device's position, and an epicyclic gear train interconnecting said drive means, said time-keeping mechanism, and said registering means, including a gear driven by said drive means, a second gear driven by said time-keeping mechanism rotating in the direction opposite said first gear, a gear rotatable in either direction and connected to said registering means, a spindle carried by one of said first two gears, a pinion journalled on said spindle and meshed with the other of said first two gears, and a second pinion journalled on said spindle, meshed with said registering means gear and interconnected with said first pinion for conjoint rotation therewith.

6. In a navigational registering device, gyroscope actuated drive means responsive to a change in the spatial relationship of such device as a resultant of diurnal rotation of the earth and a shift in position of the device over the surface of the earth, time-keeping mechanism, means for registering the longitude component of such device's position, and an epicyclic gear train interconnecting said drive means, said time-keeping mechanism, and said registering means, including a gear driven by said drive means, a second gear driven by said time-keeping mechanism rotating in the direction opposite said first gear, a gear rotatable in either direction and connected to said registering means, a spindle carried by one of said first two gears, a pinion journalled on said spindle and meshed with the other of said first two gears, and a second pinion journalled on said spindle, meshed with said registering means gear and interconnected with said first pinion for conjoint rotation therewith, the ratio of the diameter of said registering means gear to that of said second pinion being twice the ratio of the diameter of the gear meshed with said first pinion to that of said first pinion.

7. In a navigational registering device, an oscillating, gyroscope actuated receiver responsive to a component of such device's position, a member mounted for oscillation in synchronism with said receiver, a member mounted adjacent to said first member for movement independently thereof, and cooperating magnetically with said first member for movement thereby in response to a shift of the zero acceleration phase of said oscillating first member, but incapable of being moved thereby in response to individual oscillations thereof, and means actuated by said second member for registering a change in such component of the device's position.

8. In a navigational registering device, an oscillating, gyroscope actuated receiver responsive to a component of such device's position, a member oscillated through a small amplitude by said receiver, a member of comparatively large mass and moment of inertia as compared to the mass and moment of inertia of said first member, means supporting said members adjacent to each other, said members cooperating magnetically to transmit absolute rotation of said first member to said second member, but the inertia of said second member being sufficiently great to render it unable to follow the individual oscillations of said first member, and means driven by movement of said second member for registering such component of the device's position.

9. In a navigational registering device, an oscillating, gyroscope actuated receiver responsive to a component of such device's position, a magnet pivotally mounted to rotate about an upright axis and oscillated through a small angle by said receiver, an armature for said magnet, means supporting said armature adjacent to said magnet for rotation about an axis coaxial with the rotative axis of said magnet, said armature being attracted by said magnet to follow a shift of the zero acceleration phase of said oscillating magnet but incapable of following individual oscillations thereof, and means actuated by said armature for registering a change of such component of the device's position.

10. In a navigational registering device, an oscillating, gyroscope actuated receiver responsive to a component of such device's position, a cradle pivotally mounted to rotate about an upright axis and oscillated through a small angle by said receiver, a U-shaped magnet carried in said cradle and oscillatable therewith, an armature for said magnet, means supporting said armature between the poles of said magnet but spaced slightly therefrom, and guiding the armature for rotation about an axis coaxial with the rotative axis of said cradle, said armature being attracted by said magnet to follow a shift of the zero acceleration phase of said oscillating cradle but incable of following individual oscillations thereof, and means actuated by said armature for registering a change of such component of the device's position.

11. In a navigational device, a globe representing the earth, a position indicator having a pointer movable closely adjacent to and over the surface of said globe, means supporting said position indicator and guiding it for swinging relative to said globe about an axis always lying in the equatorial plane of said globe and intersecting its polar axis, and drive means responsive to the latitude component of said device's position and directly engaged with said supporting means to effect such swinging of said position indicator along a meridian of said globe.

12. In a navigational device, a frame, a globe representing the earth and journaled in said frame for relative rotation of said globe and frame about the polar axis of said globe, drive means responsive to the longitude component of such device's position and operatively interengaged between said frame and said globe, thus to rotate said globe and said frame relatively, a position indicator having a pointer movable closely adjacent said globe, means supporting said position indicator from said frame for relative swinging of said position indicator and globe about an axis lying in the equatorial plane of said globe and intersecting its polar axis, and drive means responsive to the latitude component of such device's position and operatively interengaged between said position indicator supporting means and said frame to effect said relative swinging thereof.

MEREDITH JONES.